US010876635B2

(12) United States Patent
Sander (10) Patent No.: US 10,876,635 B2
(45) Date of Patent: Dec. 29, 2020

(54) VALVE COMPONENT ARRANGEMENT AND A CONTROL VALVE WITH A VALVE COMPONENT ARRANGEMENT

(71) Applicant: SAMSON AKTIENGESELLSCHAFT, Frankfurt (DE)

(72) Inventor: Andreas Sander, Laudenbach (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 0 days.

(21) Appl. No.: 16/039,611

(22) Filed: Jul. 19, 2018

(65) Prior Publication Data

US 2019/0024803 A1    Jan. 24, 2019

(30) Foreign Application Priority Data

Jul. 19, 2017    (DE) .................... 20 2017 104 280 U (51) Int. Cl.
*F16K 1/42*    (2006.01)
*F16K 3/26*    (2006.01)
(Continued)

(52) U.S. Cl.
CPC ................ *F16K 1/42* (2013.01); *F16K 1/427* (2013.01); *F16K 1/465* (2013.01); *F16K 3/267* (2013.01); *F16K 5/184* (2013.01); *F16K 47/08* (2013.01)

(58) Field of Classification Search
CPC . F16K 1/42; F16K 1/427; F16K 1/465; F16K 5/184; F16K 47/08; F16K 3/267
See application file for complete search history.

(56) References Cited

U.S. PATENT DOCUMENTS

| 1,675,082 A | * | 6/1928 | Aular | .................... F16K 15/025 |
| | | | | 137/543.23 |
| 1,751,664 A | | 3/1930 | Smith | |
| (Continued) | | | | |

FOREIGN PATENT DOCUMENTS

DE    602004002478 T2    6/2007
DE    10 2015 009 421 A1    1/2017

OTHER PUBLICATIONS

German Search Report dated Jun. 30, 2020, for Application No. 20 2017 104280.4 (with English-language translation).

*Primary Examiner* — Jessica Cahill
*Assistant Examiner* — Patrick C Williams
(74) *Attorney, Agent, or Firm* — Schiff Hardin LLP (57) ABSTRACT

A valve component includes a valve housing having a passage extending along a longitudinal axis; a valve component mountable on the valve housing; a seal to circumferentially seal between the valve housing and the valve component; and a contact abutment to be disposed in the axial direction between the seal and valve housing, and which is configured to be movable in a pre-assembled state relative to the valve housing and the valve component. In an assembled state, the seal can be inserted into an annular-groove-shaped seal receptacle limited by the valve component, valve housing, and contact abutment. The valve housing, valve component, and contact abutment can be matched to each other such that the seal receptacle is reduced when the valve component is mounted on the valve housing, the contact abutment being supported on the valve housing. The contact abutment can undergo a relative movement relative to the valve component.

17 Claims, 3 Drawing Sheets

(51) Int. Cl.
*F16K 1/46* (2006.01)
*F16K 47/08* (2006.01)
*F16K 5/18* (2006.01)

(56) References Cited

U.S. PATENT DOCUMENTS

| | | | |
|---|---|---|---|
| 1,770,112 A | | 7/1930 | Smith |
| 3,263,961 A | * | 8/1966 | Varga .................. F16K 1/42 251/332 |
| 4,531,545 A | | 7/1985 | Muchow |
| 4,773,442 A | * | 9/1988 | Lephilibert ............ F16K 1/42 137/315.28 |
| 5,080,120 A | * | 1/1992 | Jordan .................. F16K 1/42 137/1 |
| 7,854,239 B2 | * | 12/2010 | Wears ................ F16K 11/044 137/625.4 |
| 9,297,469 B2 | * | 3/2016 | Bell .................... F16K 3/243 |
| 2007/0145323 A1 | * | 6/2007 | Weingarten ............ F16K 1/427 251/363 |
| 2012/0319027 A1 | | 12/2012 | Dobbs et al. |
| 2014/0264135 A1 | | 9/2014 | Bell |
| 2017/0023137 A1 | | 1/2017 | Braeuer |

\* cited by examiner

VALVE COMPONENT ARRANGEMENT AND A CONTROL VALVE WITH A VALVE COMPONENT ARRANGEMENT

CROSS REFERENCE TO RELATED APPLICATIONS

This patent application claims priority to German Patent Application No. 20 2017 104 280.4, filed Jul. 19, 2017, which is incorporated herein by reference in its entirety.

BACKGROUND

The disclosure relates to a valve component arrangement for a control valve and a control valve with a valve component arrangement. Control valves are used for adjusting a process fluid flow of a processing plant, such as a petrochemical plant, a food processing plant, such as a brewery, a power plant or the like.

A control valve of the appropriate type is used to adjust a process fluid flow of the processing plant. The control valve can be assigned to a pneumatic positioner which controls a pneumatic actuator by means of pneumatic auxiliary energy, which can move a control valve member to a desired control position.

A control valve, for example, is known from DE 10 2015 009 421 A1. It comprises a valve housing and a valve cage inserted therein, to which a valve seat is fixed. A valve member is movably mounted inside the valve cage to widen or narrow a passage of the control valve to adjust the process fluid flow. The valve housing has a portion with an inwardly extending shoulder in the radial direction which, together with a radially outwardly facing shoulder of the valve seat, forms a seal receptacle with a rectangular cross-section. A seal is arranged in the seal receptacle, the seal comprising a fork-shaped seal body with two tines and a radial expansion spring. In the axial direction, the seal is positioned centrally within the seal receptacle with axial distances to the opposite side flanks of the shoulders, so that the seal always remains movable within the seat even in the event of thermal expansion in the axial direction. In the radial direction, the seal is clamped by the expansion ring and, if necessary, by an undersizing or oversizing of the radial walls of the receptacle.

This seal is easy to install and seals with great reliability under normal operating conditions. However, it has been shown that under extreme operating conditions, where large differences in pressure and/or temperature occur between the inlet and outlet of the control valve, the known seal can no longer provide the optimum sealing effect.

Therefore, there is a desire for a seal for a control valve with valve cage, which can provide a sealing effect even under the most extreme conditions while being as easy to install as possible. In addition, the known final controlling device requires the seal to be replaced at regular intervals when used with aggressive process fluid media. Thanks to the axial sections between the seal and the opposite shoulders, a tool can be inserted between the valve housing and the sealing ring to remove the seal from the housing. However, this type of removal is not easy, especially for untrained installation personnel, and can lead to damage to the valve housing, which can lead to leaks in subsequent operation. It is therefore desirable to provide a way of removing a seal from a control valve of the same type to prevent damage to the sealing valve.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an object of the disclosure to provide a valve component arrangement that overcomes the disadvantages of the prior art and, in particular, is easy to install and can be reliably sealed even under extreme conditions.

Accordingly, a valve component arrangement is provided for a final controlling device for adjusting a process fluid flow of a processing plant, wherein the control valve has a valve housing with an inlet and an outlet for the process fluid flow. In an exemplary embodiment, the valve component arrangement comprises a valve housing portion with a process fluid flow passage extending along a longitudinal axis. The passage is provided in the direction of fluid flow between the inlet and outlet of the valve housing. The passage can be closed by a valve member of the control valve. The valve component arrangement further comprises a valve component mountable to the valve housing portion. The valve component can be realized by a valve seat and/or a valve cage. The control valve can be closed by a sealing contact between the valve seat and a valve member cooperating with the valve seat. When the valve member moves from such a closed position to an open position, a valve cage may be provided which at least partially blocks a process fluid passage surface located downstream or upstream of the passage to provide throttling action. It is also conceivable that a valve member without a valve seat cooperates exclusively with a valve cage, whereby valve member and valve cage are adapted to the shape such that a sealing effect is provided in at least one position of the valve member relative to the valve cage. The valve component arrangement further comprises a seal for circumferential sealing between the valve housing portion and the valve component. In an exemplary embodiment, the seal is designed as a ring seal, for example as an O-ring, X-ring or the like. In an exemplary embodiment, the seal is designed to be particularly resistant to temperature and/or chemicals. In particular, the seal can be designed as a graphite seal.

In an exemplary embodiment, the valve component arrangement further comprises a contact abutment to be axially disposed between the seal and the valve housing portion and which is movable relative to the valve housing portion and relative to the valve component in a pre-assembled condition. The contact abutment can be designed in one-piece or in multi-piece. In an exemplary embodiment, the contact abutment is annular with a diameter that essentially corresponds to the diameter of the seal and/or a seal receptacle. In an exemplary embodiment, the contact abutment slides in axial direction relative to the valve component. The contact abutment can be held to the valve component with an axial bearing.

In an exemplary embodiment, the valve component arrangement may be in a pre-assembled state in which, for example, the valve component is not inserted into the valve housing and, in particular, is not in axial contact with the valve housing portion. In the pre-assembled state, there is at least one annular gap in the axial direction between the valve housing portion and the valve component. In an assembled state of the valve component arrangement, the valve component at the passage is in axial contact with the valve housing portion. In an exemplary embodiment, there is a contact between the valve housing portion and a valve component, preferably (but not limited to) a valve seat, in the axial direction. In particular, a circumferential contact between the at least one valve component, for example a valve seat and/or a valve cage, and a valve housing portion can be realized in the radial direction in the mounting state of the valve component arrangement. In an exemplary embodiment, the valve housing portion can have a flange edge, in particular a stepped flange edge, which extends circumferentially around the passage and which can form an axial mounting stop for at least one valve component.

According embodiments of the disclosure, in an assembled state of the valve component arrangement, the seal is inserted into an annular-groove-shaped seal receptacle, which is limited by the valve component, for example the valve seat and/or the valve cage, the valve housing portion and the contact abutment. For example, in the assembled state, the seating of the seal is limited in the axial direction on the one hand by the contact abutment and on the other hand by the valve component. In an exemplary embodiment, in the assembled state, the annular-groove-shaped seal receptacle in the radial direction is limited internally by the valve component and externally by the valve housing portion. In an exemplary embodiment, in the assembled state, the contact abutment is located in the axial direction between the valve housing and the seal receptacle or the seal received therein. In an exemplary embodiment, in the radial direction, the contact abutment is located in the mounting position between the valve component and the valve housing portion.

Alternatively, the contact abutment can be stationary fixed to the valve housing portion in the area in which the valve component is inserted. In the pre-assembled state, in such an embodiment the seal is held, for example, by an axial face end wall section and a radial peripheral section of the valve component and only comes into contact with the valve housing portion and the contact abutment when the valve component is mounted on the valve housing portion.

In an exemplary embodiment of the disclosure, the valve housing portion, the valve component and the contact abutment are matched to each other, in particular dimensioned, arranged and/or, preferably the contact abutment on the valve component, mounted in such a way that the seal receptacle is preferably reduced in the axial direction when the valve component is mounted on the valve housing portion. Mounting the valve component to the valve housing portion describes the transition from the pre-assembled state to the assembled state. In an exemplary embodiment, the contact abutment is mounted on the valve component. In an exemplary embodiment, a clearance fit and/or a sliding fit may be provided in the radial direction between the contact abutment and the valve component, which preferably permits movement of the contact abutment relative to the valve component in the axial direction. The bearing of the contact abutment on the valve component can provide a loss protection of the contact abutment relative to the valve component. A sliding and/or clearance fit may be provided in the radial direction between the contact abutment and the valve housing distance. In an exemplary embodiment, in the radial direction between the valve component and the valve housing distance, a fit is provided which can be realized as a sliding fit, a clearance fit or a press fit. It is also conceivable that no contact surface is provided in the radial direction between the valve housing portion and the valve component; for example, in the radial direction between the valve component and the valve housing portion, the contact abutment and the seal may be interposed such that an indirect contact between the valve component and the valve housing portion is realized with these components without the latter components coming into direct contact. During the assembly of the valve component on the valve housing portion, the contact abutment is supported at least temporarily on the valve housing, in particular at least during the period during which the seal receptacle is reduced, and the contact abutment undergoes a relative movement with respect to the valve component.

For example, the contact abutment may rest on a flange-like radial cantilever of the valve housing portion, while the valve component is inserted in the axial direction, so that the contact abutment is stationary in the axial direction, while the valve component moves in the axial direction. For example, in the assembled state, the contact abutment and the valve component may rest in the same axial height on the inner cantilever of the valve housing portion, with the contact abutment projecting in the axial direction relative to the valve component in a pre-assembled condition, so that when the valve component is inserted axially with the contact abutment held on it, the latter first comes into contact with the valve housing portion and is held stationary by the latter, while a further assembly movement of the valve component takes place in axial direction. In an exemplary embodiment, it is also conceivable that the valve component is designed in an axial direction in steps and that it is therefore guaranteed that with a continuous axial assembly insertion movement of the valve component with a contact abutment held thereon, contact initially occurs in the axial direction between the contact abutment and the valve housing portion and then contact occurs in the axial direction between the valve component and the valve housing portion.

This ensures that a single simple translational assembly movement of the valve component in the axial direction, especially when the valve component is inserted into the valve housing, is accompanied by compression of the seal using the contact abutment.

For example, when mounting the valve component on the valve housing portion, especially when inserting the valve component into the valve housing and until the valve component comes into axial contact with the valve housing portion, the contact abutment can be designed to be supported directly or indirectly on the valve housing portion for final mounting and reaching the operating condition and to undergo a relative movement with respect to the valve component in such a way that the seal receptacle is reduced. When the valve component is mounted in the control valve, there is a relative movement in the axial direction, especially between the contact abutment and the valve component, so that the receiving space provided by the seal receptacle for the seal is reduced in the axial direction.

For example, in a pre-assembled state in which the valve component arrangement is not located in the valve housing portion, the seal may be received in an annular-groove-like opening formed around the valve component, in particular between a radial outer wall of the valve component, an axial face end wall section of the valve components, for example an annular contact shoulder, a contact flange or the like, and opposite the axial face end wall section of the valve component on the contact abutment. As previously mentioned, the contact abutment can be mounted axially movable on the valve component, whereby the bearing can limit the mobility of the contact abutment relative to the valve component. In an exemplary embodiment, axial relative mobility is limited to a distance of less than 20 mm, less than 10 mm, less than 5 mm or even less than 1 mm, but is not limited thereto.

In an exemplary embodiment, the design of the contact abutment for a relative movement with respect to the valve components when mounting them on the valve housing portion can be used in particular for pressing the seal, for compressing the seal in the axial direction. When pressing the seal with the aid of the contact abutment, the seal may expand in the radial direction. In an exemplary embodiment, the seal is dimensioned relative to the seal receptacle so that the volume of the seal in the final assembly state of the valve component arrangement is not less than the volume of the seal receptacle in the final assembly state. This ensures that the sealing component provides a sealing contact in both the axial and radial directions. In particular, sealing between the valve component and the valve housing portion can be ensured so that the process fluid cannot flow between the inlet and outlet when the control valve is closed. In an exemplary embodiment, by providing a seal whose volume is at least as large as the volume of the reduced seal receptacle in the final assembly state, a radial and/or axial, preferably isometric, compressive stress in the seal is achieved by mounting the valve component arrangement. The compressive stress in the assembled state is accompanied by a corresponding compressive force of the sealing component against the contact surfaces on the valve component, the contact abutment and/or the valve housing portion, so that an increased sealing effect can be achieved with the compression of the seal. In an exemplary embodiment, to ensure easy assembly without damaging the seal, the seal is dimensioned such that the volume in the pre-assembly state of the valve component arrangement is not more than twice, preferably not more than 1.5 times, in particular not more than 1.1 times, the final assembly receiving volume limited by the valve component and the contact abutment.

In an exemplary embodiment, the inventive valve component arrangement comprises a carrier which is in particular stationary fixed to the valve component and is designed to carry the seal with the valve component when the valve component is removed. The carrier fixed to the valve component can be movable relative to the contact abutment. As described in detail below, it is also conceivable that the contact abutment and the carrier could be realized in a functional union or component unit. The use of such a carrier prevents the seal from sticking axially to the valve housing portion. The carrier for the seal simplifies the removal of the seal, in particular the sealing ring, from the valve housing portion and makes an additional removal step obsolete solely for removing the seal after removing the valve component from the valve housing portion.

In an exemplary embodiment of a valve component arrangement, the contact abutment is held axially movable on the valve component by a carrier, in particular the carrier for the seal described above. In particular, the carrier can be designed to carry the contact abutment and, if necessary, the seal with the valve component with it when dismantling the valve component. In this respect, such a carrier also provides a loss protection and a positioning safety device for the contact abutment. The contact abutment can transmit a carrying effect to the seal from a carrier that is stationary fixed to the valve component.

In an exemplary embodiment, according to a further configuration of an inventive valve component arrangement, the contact abutment and/or the carrier is held to the valve component by at least one connection that can be released in the axial direction, such as a pair of threads or a bayonet connection. Such a connection simplifies the assembly of the carrier and/or the abutment and, if necessary, the seal on the valve component, especially in its pre-assembled state dismantled from the valve housing.

In an exemplary embodiment, according to another configuration of an inventive valve component arrangement, which can be combined with the previous one, the contact abutment and/or the carrier is held on the valve component by a radially releasable connection, for example with pins, undercuts or similar. For example, the actual carrier can be driven as a pin in the radial direction through a ring-like contact abutment in the body of the valve component, whereby several pins can be provided circumferentially distributed, for example two, three, four, five or more, which realize a loss protection of the contact abutment relative to the valve component and permit axial movement to a limited extent of the contact abutment relative to the component. It is also conceivable, for example, that a contact abutment formed from several partial ring sections can be inserted radially through undercuts which engage in form-complementary bulges on the valve housing. Such pitch circle sections should have a maximum of 180° pitch circle sections for simple assembly.

In an exemplary embodiment, according to a further configuration of an inventive valve component arrangement that can be combined with the previous ones, the carrier has at least one radial engaging part protruding from the valve component, such as a pin, a nose, an external thread or a flange protuberance. In this advanced configuration, the contact abutment has at least one axial undercut, in particular a recess which is complementary in shape to the at least one engaging part, for receiving the engaging part, which is larger in the axial direction than the received engaging part.

The oversize in axial direction can define a gap width which provides the movability of the contact abutment in axial direction relative to the valve component. For example, the contact abutment can have a collar pointing inwards in the radial direction and the valve component can have a collar pointing outwards in the radial direction, which when viewed in the axial direction at least partially overlap one another so that an undercut is achieved.

In an exemplary embodiment of an inventive valve component arrangement, the contact abutment is annular. In an exemplary embodiment, the ring-shaped contact abutment is realized in one piece, i.e. as a complete ring, or in several parts consisting of pitch circle sections, whereby preferably the pitch circle sections can be joined together to form a complete ring section. In an exemplary embodiment, the contact abutment is formed in two parts from semicircular sections.

In an exemplary embodiment of a valve component arrangement, the valve component is realized by a valve cage and the contact abutment is formed in one piece with a valve seat. In this way, while the parts of the valve cage and valve seat can be manufactured relatively easily and independently of each other, small tolerances of the respective sealing surfaces can be cost-effectively realized and simple assembly of the combined valve components in the valve housing can be achieved by the separate arrangement of the contact abutment, which is realized in one piece with the valve seat.

In an exemplary embodiment, which can also be combined with one or more other aspects of the disclosure mentioned above, a valve component arrangement for a control valve for adjusting a process fluid flow of a process engineering plant, such as a process engineering plant, a chemical plant, a refinery or a brewery, is provided. The valve component arrangement comprises a valve housing for the flow of the process fluid. The valve housing has a valve housing portion which has a passage extending along a longitudinal axis, in particular an axial positioning direction of the control valve, for the flow of the process fluid. Furthermore, the valve component arrangement has a valve component mounted on the valve housing portion, such as a valve seat or a valve cage, optionally with a valve seat. In addition, the valve component arrangement has an annular seal for circumferential sealing between the valve housing portion and the valve component. According to the disclosure, the valve component has a contact abutment structurally separate from the valve housing. The contact abutment is a separate component to the valve housing portion, which can lie loosely against the valve housing portion, it can also be firmly connected to it.

In an exemplary embodiment, the contact abutment limits an annular seal receptacle in which the ring seal sits and which may also be limited by the valve housing portion and the valve component. In the operational state of the contact abutment, the latter is held exclusively by axial pressing forces, which are transmitted exclusively from the valve component via the ring seal to the contact abutment. In this respect, it is an inventive idea to hold the contact abutment, which can be designed as a ring element, loose in the axial direction between the valve housing portion and the valve component, whereby it is held in place due to the elastic axial compression of the ring seal and the resulting elastic deformation forces. If the ring seal were not used, the contact abutment could move back and forth in the axial direction within the seal receptacle. In the radial direction, a clearance fit, if not a larger gap, may be provided between the contact abutment and the valve component or valve housing portion.

Based on the teachings of this disclosure, the simplest possible installation can be achieved while guaranteeing reliable sealing performance.

In an exemplary embodiment, which can also be combined with the configuration objects mentioned above, a valve component arrangement for a control valve for adjusting a process fluid flow of a processing plant, such as a process engineering plant, a chemical plant, a refinery or a brewery, is provided. The valve component arrangement comprises a valve housing for the flow of a process fluid, which has a valve housing portion which has a passage for the flow of the process fluid extending along the longitudinal axis, in particular an axial direction of the control valve.

Furthermore, in an exemplary embodiment, the valve component arrangement comprises a valve component mounted on the valve housing portion, such as a valve seat or a valve cage, optionally with valve seat, and a ring seal for circumferential sealing between the valve housing portion and the valve component. According to the disclosure, a state of engagement is realized between the valve component and the valve housing during assembly, for example by means of a thread engagement. This occurs when the valve component is axially inserted into the valve housing portion. The structural engagement, in particular thread engagement, between valve housing portion and valve component causes a controlled guidance, in particular rotary guidance, of the valve component relative to the valve housing, so that the ring seal is not damaged due to misapplication of the valve component. If the axial displacement of the valve component continues beyond the engagement state, a release state is achieved between the valve component and the valve housing portion. The engagement between the valve component and the valve housing is released in such a way that the valve component can be displaced longitudinally in the axial direction relative to the valve housing in order to reduce the size of the seal receptacle. The associated transverse displacement of the valve component can lead in particular to the seal being pressed axially between the valve housing portion and the valve component in the seal receptacle. In an exemplary embodiment, the valve housing portion is formed by a separate contact abutment as described above. The inventive provision of a first engagement state and subsequent release state, especially after overtightening of a thread engagement and the associated thread engagement loss, makes it possible on the one hand to realize a safe and damage-free assembly of the valve component arrangement, while at the same time it can be ensured that during disassembly the engagement structure has a carrier function, especially for the ring seal.

The disclosure also concerns a control valve for adjusting a process fluid flow of a process plant having a valve housing with an inlet and an outlet for the process fluid flow, which comprise the valve component arrangement described above. In an exemplary embodiment, the valve housing portion is manufactured in one piece with the rest of the valve housing of the control valve, in particular as a cast part. In an exemplary embodiment, the control valve comprises a valve member that can move axially, especially within the valve cage. In an exemplary embodiment, the valve member of the control valve is be movable between a closed position, in which the valve member is in a sealing closing-contact engagement with the valve seat of the control valve, and an open position for passing a process fluid flow. The passage surface provided by the control valve for the process fluid flow can be adjusted by the position, in particular the distance, of the control valve member to the valve. In an exemplary embodiment, the valve cage of the control valve provides a throttling effect, so that even when the valve member position is partially or completely open, the process fluid flowing through the passage is throttled by the valve cage. In an exemplary embodiment, the control valve is designed with a pneumatic actuator, such as a single-acting pneumatic actuator with spring return or a double-acting pneumatic actuator with two oppositely acting pneumatic operating chambers.

Figure 1A:
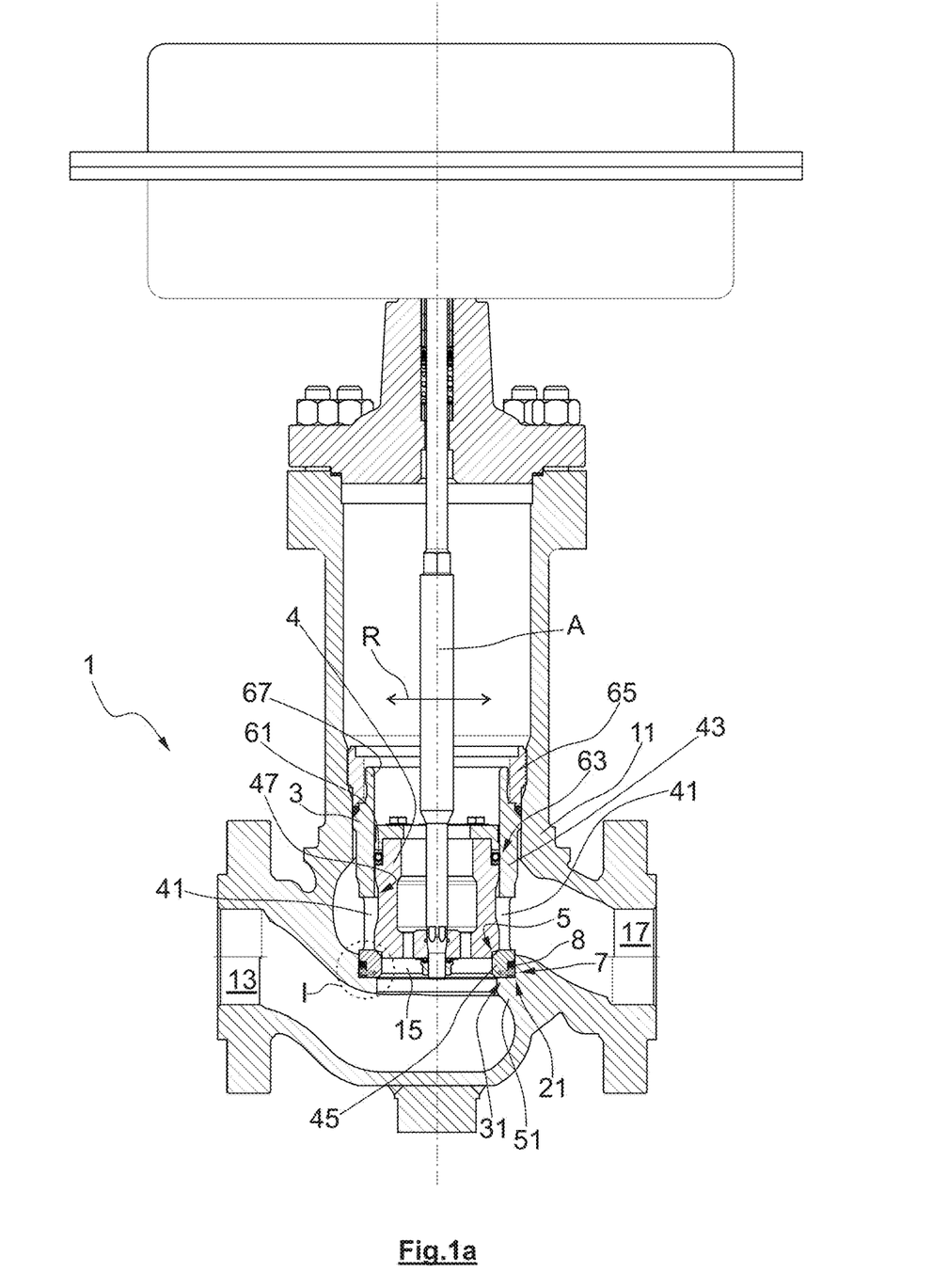
FIG. 1a illustrates a sectional view of an inventive control valve according to an exemplary embodiment whose valve member is in a fully open position.
Figure 1B:
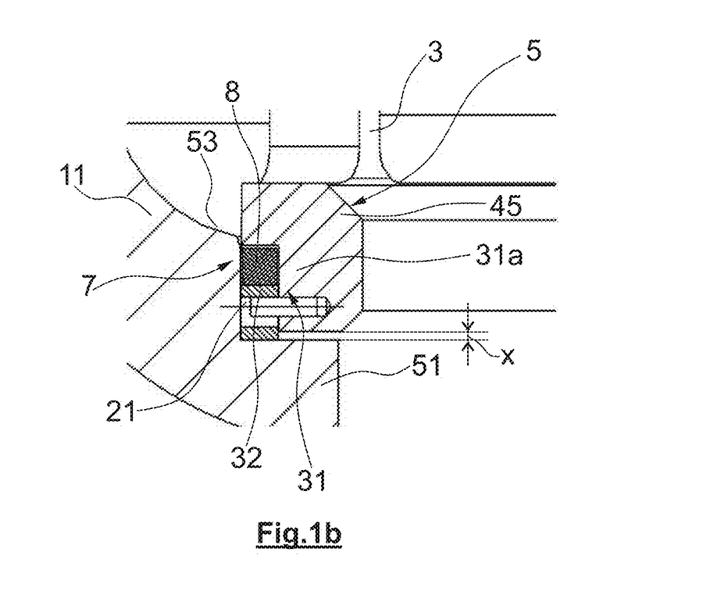
FIG. 1b illustrates is a detailed view of a valve component arrangement according to an exemplary embodiment, as shown in FIG. 1a, in a pre-assembled state.
Figure 1C:
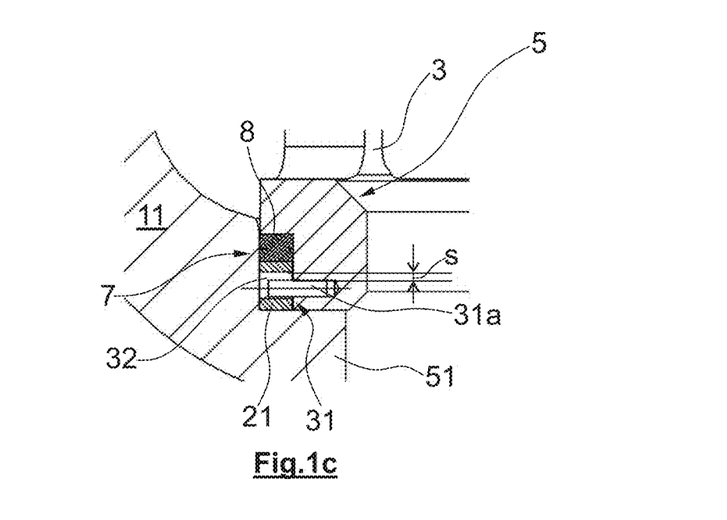
FIG. 1c illustrates the valve component arrangement according to FIG. 1a in a mounting state or final mounting state.

In an exemplary embodiment, the inventive control valve 1 shown in FIG. 1 comprises a valve housing 11 as main component with an inlet 13 and an outlet 17 for a process fluid flow as well as a valve component inserted into the valve housing 11, which realizes a valve cage 3 and has a frustoconical shaped tapering section for providing a valve seat 5. In an exemplary embodiment, the control valve according to the disclosure comprises as a further main component a seal 8, which is used for circumferential sealing between the valve housing 11 and valve components 3, 5, and a contact abutment, which is shown in FIGS. 1a, 1b and 1c according to a an embodiment of the disclosure and is provided with the reference symbol 21. FIGS. 1b and 1c show a detailed view of the control valve 1 according to FIG. 1, which shows a valve component arrangement according to the disclosure.

Control valve 1 according to an exemplary embodiment is shown in FIG. 1a, highlighting the valve component arrangement according to the disclosure, whereby for easier readability a complete representation of the valve housing 11 and the valve actuator attached thereto, which actuates the cylinder piston-shaped valve element 4 via a valve rod, is waived.

At the control valve 1, an exemplary valve cage 3 with large, flow through openings 41 for the process fluid is depicted. Instead of the depicted large, square windows 41 with rounded corners, windows of a different shape, smaller passage channels, in particular for causing throttling, more or less channels for the passage of process fluid from inlet 13 to outlet 17 may be provided. The valve cage 3 has a substantially hollow cylindrical shape, whereby the radial outside of the valve cage can be in contact with the valve housing. In particular, the ends of the valve cage 3 on the face end or bottom end in axial direction A should be in at least indirect, preferably direct contact with a contact flange, cover or the like, of the valve housing 11. The bottom end 45 of the valve cage 3 is held in axial direction A at a holding section or flange section 51 projecting inwards from the valve housing 11 in radial direction R, which encloses a passage 15 for the process fluid flow. To get from inlet 13 to outlet 17, the process fluid has to flow through passage 15 and through the windows 41 of valve cage 3.

In an exemplary embodiment, the radial inner side 47 of the valve cage 3 movably accommodates the valve element 4 in axial direction A in a form-complementary manner. To provide a sealing effect between the inner side 41 of valve cage 3 and valve member 4, a sealing 61 may be attached to valve member 4, for example held in a circumferential groove 63 of valve member 4. The face end of the valve member can have a tapered area, in particular a conical section, for a sealing contact with the valve seat 5. The valve cage 3 can be one-piece or multi-part as shown. In an exemplary embodiment, for mounting valve 1, the valve cage 3 is clamped in the axial direction between a valve housing cover (not shown in detail) and the inner flange 51 of the valve housing.

In an exemplary embodiment, in the configuration shown in FIG. 1a, a fixing sleeve 65 with external threads is provided, which is engaged with an internal thread of the valve housing 11 in order to exert axial holding forces and clamping forces on the valve cage 3. The axial holding and clamping forces acting on the valve cage 3 are transmitted from the valve cage 3 to the sealing ring 8 at its bottom end 45. To disassemble the valve cage 3, the mounting sleeve 65 can be unscrewed from the valve housing 11. The valve cage 47 can be removed from the valve housing 11 in the axial direction. In order to facilitate the removal of the valve cage 3 from the body 11, the valve cage 67 can have a screw-in device, for example an external thread 67, an internal thread, a bayonet connection or the like (not shown in detail) at its cylindrical valve seat 5 distant end 67.

FIGS. 1b and 1c show in detail the valve component arrangement of control valve 1 according to FIG. 1a, on the one hand in the pre-assembled state (FIG. 1b) and on the other hand in the final assembly state (FIG. 1c). In the pre-assembled state according to FIG. 1b, the valve cage 3 is not yet in axial contact with the inner flange 51 of the housing. In axial direction A, an axial gap of height x is formed between the inner flange 51 of the housing and the valve cage 3.

In the pre-assembly state shown in FIG. 1b, the contact abutment 21 is already in contact with the inner flange 51 of the valve housing, preferably over its entire circumference. The contact abutment 21 of the embodiment shown in FIGS. 1a, 1b and 1c is annular and shows a series of circumferentially distributed recesses 32. In FIG. 1a two openings or recesses 32 are visible, but the contact abutment 21 can also have another number of recesses 32, for example three, four, five, seven or more, recesses 32. An assembly pin 31a engages in each of the recesses 32 of the contact abutment ring 21, which is pressed into a respective blind hole at the bottom end 45 of the valve cage 3. Instead of the pressed-in pins 31a, grub screws or the like could also be inserted in threaded holes at the bottom end 45 of the cage 3.

In an exemplary embodiment, the pin 31a realizes a carrier 31 to carry the contact abutment 21 and the sealing ring 8 with the disassembly of the valve cage 3 from the valve housing 11. 31a is realized as an engaging part, which projects radially outwards from the bottom end 45 of the valve cage 3 and projects into the recess 32 of the contact abutment 21. The recess 32 is formed with an axial play with respect to the pin 31a, so that when the valve cage 3 moves from the pre-assembly position according to FIG. 1b to the final assembly position according to FIG. 1c, the pin 31a can move relative to the contact abutment 21 in its recess 32. The axial clearance between pin 31a and the contact abutment 21 is at least as large as the height of the axial gap x. Preferably, the axial play of the engaging part, which, for example, is realized as pin 31a, and the contact abutment with the recess 32 or the like formed therein is at least slightly greater than the axial gap height x.

In an exemplary embodiment, in the pre-assembly state shown in FIG. 1b, the seal is implemented as sealing ring 8 and is arranged in a seal receptacle 7, which is externally limited in radial direction R from a section of the valve housing 11, which projects in axial direction A from its inner flange 51. In the embodiments according to FIGS. 1a to 1c, the sealing receptacle 7 is internally limited in radial direction R by a radial outer peripheral wall of the valve component formed as valve cage 3. In axial direction A, a shoulder surface in the form of an annular axial end face section of the valve component limits the receptacle 7, a further axial limitation of the seal receptacle 7 is realized by the contact abutment 21. It is also conceivable that the contact abutment 21 and the radial inner flange 51 of the valve housing 11 provide axial limitations of the seal receptacle 7 (not shown in detail).

The sealing ring 8 is shown in the embodiments as a rotating body with a substantially square cross-section. Other cross-section shapes are also conceivable, for example an O-shape, an X-shape or a V-shape. In an exemplary embodiment, the sealing ring 8 is made of graphite. Graphite gaskets are particularly resistant to temperature and chemicals.

In an exemplary embodiment, when the valve component of the valve cage 3 is pressed against the end face of the valve housing portion in form of the radial inner flange 51 when the valve component is mounted, the gap between valve component and valve housing 11 disappears. During the movement of the valve cage 3 relative to the valve housing 11 from the pre-assembly state shown in FIG. 1*b* to the assembly state shown in FIG. 1*c*, the contact abutment remains stationary relative to the valve housing 11. This results in a relative movement between the contact abutment 21 and the valve cage 3 being mounted. As a result of the relative movement between valve cage 3 and contact abutment 21, the space available as seal receptacle 7 is reduced in axial direction A.

In an exemplary embodiment, seal 8 is dimensioned such that its expansion in axial direction A substantially corresponds to the axial height of the seal receptacle 7 in the pre-assembled state. The seal 8 can be slightly smaller in axial direction A than the axial height of the seal receptacle 7 in the pre-assembled state. Preferably, the seal in axial direction A is not smaller than the axial height of the seal receptacle groove in the pre-assembled state minus the height of the mounting gap x.

By overcoming the mounting gap x during valve component mounting, the seal receptacle 7 is reduced in axial direction A by the axial height x of the mounting gap. Overcoming this height difference x reduces the space of the seal receptacle so that seal 8 arranged in the seal receptacle 7 is compressed in the axial direction. Depending on the compressibility of the seal 8, expansion of the seal 8 in radial direction R is preferable due to the compression of the seal 8 in axial direction A. The deformation of the seal 8 may in particular cause the seal 8 to make sealing contact directly or indirectly between the valve cage 3 and the section of the valve housing 11 in engagement with it in axial direction A and, if necessary, in radial direction R.

In the exemplary embodiment shown in FIG. 1*b*, the seal ring 8 in the uncompressed, unmounted state in radial direction R is smaller than the expansion of the seal receptacle 7, in particular smaller than the radial distance between the outer peripheral wall of the valve cage 3 and the peripheral inner wall of the valve housing 11, which in the mounted state lies at the same axial height. It is conceivable that in the unmounted state the seal 8 is larger in radial direction R than this distance. In such an oversized seal, radial compression between the valve component and the valve housing occurs as soon as a valve cage 3 with seal 8 held by it penetrates into the collar or projection of the valve housing 11 extending from the inner flange 51 in axial direction A before reaching the final assembly state (not shown in detail).

FIG. 1*c* shows the compressed state of a seal and the final assembly state of the valve component arrangement according to an exemplary embodiment. In an exemplary embodiment, in the final assembly condition, seal 8 fills the space of the seal receptacle 7 completely. The pin may come into contact with the underside of the recess 32 of the contact abutment 21, or, as shown in FIG. 1*c*, there may be a small distance or small axial play s between the pin 31 and the lower end of the recess 32.

Figure 2:
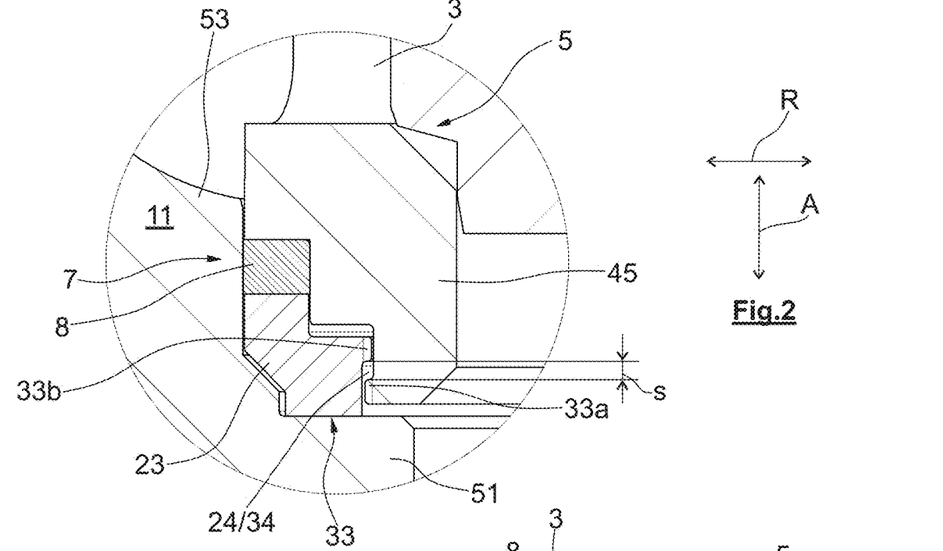
FIG. 2 illustrates a valve component arrangement according to an exemplary embodiment in its mounting state.
Figure 3:
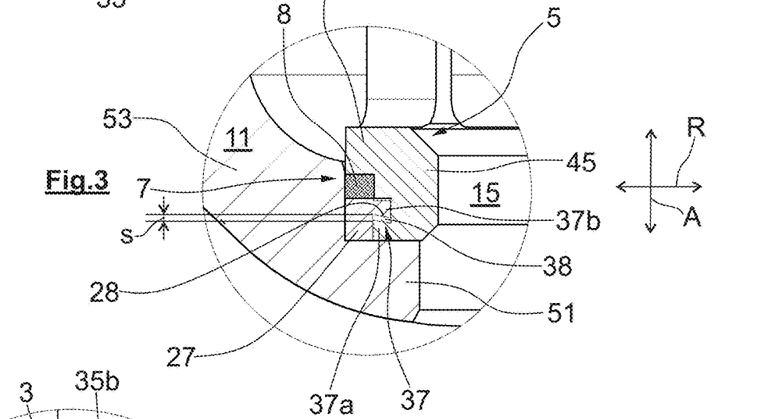
FIG. 3 illustrates a valve component arrangement according to an exemplary embodiment in its mounting state.
Figure 4:
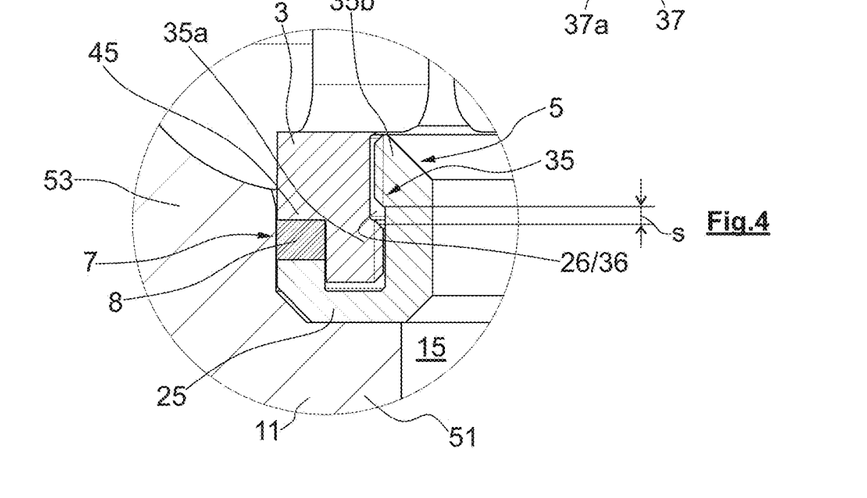
FIG. 4 illustrates a valve component arrangement according to an exemplary embodiment in its mounting state.

The valve component arrangements shown in FIGS. 2, 3 and 4 differ from those described above substantially only in the shape of the contact abutment and in particular the respective engaging part recess pairing, which is why different reference signs are used for the different engaging parts and recesses in different designs of disclosure-compliant valve component arrangements. For the same or similar components, similar or identical reference symbols are selected in the figures. The special design of the valve components for the version according to FIG. 4 will be discussed in detail later.

FIGS. 2, 3 and 4 show the respective design of an inventive valve component arrangement only in the respective final assembly state similar to that shown in FIG. 1*c*. The pre-assembly state according to FIG. 1*b* is not shown again separately for the individual versions of FIGS. 2, 3 and 4, as it is easy to see from the final assembly state shown how the respective pre-assembly state would look, in which the respective contact abutment 23, 25 or 27 is already in contact with the respective valve housing inner flange 51, while an (not shown in detail) axial distance x between the valve component remains in the pre-assembly state to its final assembly position (see FIG. 1*b*). In an exemplary embodiment of a valve component arrangement according to FIG. 2, the contact abutment 23 is annular and has a radially outwardly recessed portion on its inside and an inwardly protruding radial projection, starting from the recessed portion in radial direction R, completely realized with an internal thread 33*b*. The bottom end 45 of the valve component has an external thread corresponding to the internal thread 33*b* of the abutment 23 along a thread section 33*a* formed at the axial end of the bottom end 45. The axial height of the male thread section 33*a* is smaller than the axial height of the recessed section of the contact abutment 23 so that the male thread 33*a* is freely movable along the recessed section of the abutment 23 or with a radial clearance.

In the final mounting condition shown in FIG. 2, axial clearance s is provided in axial direction A between the external thread section 33*a* of the valve component and the internal thread section 33*b*. In the final assembly condition of the contact abutment 23 (25) shown in FIG. 2 (and correspondingly in FIG. 4), the thread 33*a* (or 35*a*) at the bottom end 45 of the valve cage 3 is screwed onto the thread 33*b* (or 35*b*) of the contact abutment 23 (or 25) in axial direction A over more than one complete thread length and beyond. In the final assembly condition, there is no thread engagement of the threads of the valve cage and the contact abutment. An axial clearance s is formed between the thread at the bottom end 45 of the valve cage 3 and the thread at the contact abutment 23 or 25. Since the threads form undercutting radial projections when viewed in axial direction A, the threads realize a carrier. The valve cage 3 and the contact abutment 23 or 25 are captively connected by this carrier. The sealing ring 8 is pressed between the contact abutment 25 or 23 and the bottom end 45 of the valve cage 3 in the final assembly state.

In an exemplary embodiment, the axial play s is at least so large that mounting tolerances of the thread projections 33*a*, 33*b* are compensated in axial direction. In an exemplary embodiment, the axial distance between the thread projections 33*a*, 33*b* is intended to form an axial clearance x for the pre-assembly condition. Thus, the contact abutment 23, which is completely screwed on and over the external thread of valve component 3 and can again move in axial direction A without thread guidance, can be designed to provide relative mobility between the axial contact abutment 23 and the valve component for mounting the valve component in accordance with the disclosure. In an exemplary embodiment, the seal 8 is pressed in the seal receptacle 7 between the contact abutment 23 and the bottom end 45 of the valve components in a state where there is no thread engagement between the internal thread section 33b and the external thread section 33a.

To mount the abutment, the contact abutment 23 is screwed with its thread section 33b over the thread 33b of the valve component until it is again free of any thread engagement between the two parts. The protruding external thread 33a of the valve component realizes an engaging part projecting outwards from the valve component in radial direction R, which serves as a carrier 33, which engages in a recess 24 in the form of the section set back outwards in radial direction. The inwardly protruding turns 33b of the contact abutment 23 realize an undercut, which serves to carry the contact abutment 23 with it.

In an exemplary embodiment, the radial sealing surface of the valve component to which the seal 8 rests has an outer diameter at least equal to the outer diameter of the outer thread 33a. In an exemplary embodiment, the radius of the sealing surface is slightly larger, in particular at least 0.1 mm, than the outer diameter of thread 33a, so that the seal 8 is simply pushed on in axial direction A without the seal 8 being damaged by thread 33a when the contact abutment 23 is removed. In axial direction A between the external thread 33a and the sealing section of the valve component, a recess 34 is provided in which the projection 24 can engage with the internal thread 33 of the contact abutment 23. The recessed surface of the contact abutment 23 provides a recess 24 for receiving the carrier 33 in the form of the radially protruding thread section 33a.

FIG. 3 shows a detailed view of an inventive valve component arrangement according to an exemplary embodiment in which the engaging part 37a is realized as a radially outwardly projecting flange protuberance 37 at the bottom end 45 of the valve component. In the axial direction, this flange protuberance 37a forms an undercut 38 into which a radially inwardly projecting flange protuberance 37b of the contact abutment 27 engages. The contact abutment 27 can be inserted into recess 38 at the bottom end 45 of valve cage 3, for example by a bayonet connection (not shown in detail) and/or be integral. Alternatively, the contact abutment 27 can consist of several partial ring sections, each of which is inserted in the radial direction into the bottom end 45 of the valve cage 3. The radially inwardly projecting flange section 37b of the contact abutment 27 and the radially outwardly projecting flange section 37a of the valve component have opposite contact surfaces in axial direction A, which have a frustoconical surface, which each have a cone angle with respect to the axial axis A, which are at least nearly, preferably completely identical. The inclination of the contact surface preferably has an angle of inclination of at least 2°, preferably between 5° and 10°, possibly up to 45°, so that an undercut is realized in radial direction R, which counteracts an axial and/or radial sliding of the contact abutment 27 from the valve component.

In an exemplary embodiment, the sealing surface of the contact abutment 27 facing the sealing body 8 is smaller in radial direction R than the distance between the circumferential sealing surface of the valve component facing in radial direction and the inner circumferential surface of the shoulder 53 of the valve housing 11 facing in radial direction, so that axial mobility of the contact abutment 27 is ensured without contact between the abutment 27 and the valve component. Between the inwardly facing flange 37b of the contact abutment 27 and the outwardly facing flange 37a of the valve component, a recess 38 is provided in axial direction A which provides axial clearance x to allow relative movement between the contact abutment 27 and the valve component when the valve component is moved from a pre-assembled state to the final assembly state shown in FIG. 3. The valve component has a recess 38 in axial direction A between its radially protruding flange 37a and the remaining body for receiving the flange 37 of the abutment 27. The abutment 27 forms a recess 27 in axial direction A for the radial protuberance 37a of the valve component.

FIG. 4 differs from the previously described inventive embodiments of valve component arrangements substantially in that the valve seat 5 and the valve cage 3 are realized by separate components. In the embodiments shown in FIGS. 1a to 1c, 2 and 3, the valve seat is realized in one piece with the valve cage 3. In the embodiment shown in FIG. 4, the valve seat 5 is realized in one piece with the contact abutment 25. The bottom end 45 of the valve cage 3 is held in a recess 26 of the approximately L-shaped unit consisting of contact abutment 25 and valve cage 5 in the axial direction. Similar to the embodiment described in FIG. 3, flange sections projecting radially inwards or radially outwards are provided on the one hand on the contact abutment 25 and on the other hand on the valve cage 3, which are spaced apart in axial direction A, so that sufficient axial play x (not shown in detail) is provided so that when the valve components are inserted, a pressing movement for pressing the seal 8 between the (not shown in detail) pre-assembly state and the final assembly state shown in FIG. 4 is possible.

In an exemplary embodiment of a valve component arrangement shown in FIG. 4, it is the contact abutment 25, which has a radially outwardly projecting flange portion 35b which cooperates with a radially inwardly projecting flange portion 35a of the valve cage 3. A bayonet-like connection is preferred for mounting the abutment 25. The radially outward facing flange protuberance 35b, which is arranged in axial direction approximately at the level of the valve seat 5, realizes the carrier 35, which holds the contact abutment 25 on the valve cage 3 when mounting it, so that the seal 8 is also carried by the contact abutment 25, so that it is also carried with the valve cage 3.

The features revealed in the above description, the figures and the claims may be important for the realization of the disclosure in the various forms, either individually or in any combination.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1 control valve
3 valve cage
4 valve member
5 valve seat
7 seal receptacle
8 sealing ring
11 valve housing
13 inlet
15 passage opening
17 outlet
21, 23, 25, 27 contact abutment
31 carrier
31a pin
32, 34 recess
33 carrier
37 flange protuberance
38 undercut
41 flow-through opening
45 bottom end
47 inner side
51 flange portion
53 shoulder
61 sealing
63 circumferential groove
65 fastening sleeve
67 external thread

The invention claimed is:

1. A valve component arrangement for a control valve for adjusting a process fluid flow, the control valve having an inlet and an outlet for the process fluid flow, the valve component arrangement comprising:
a valve housing having a passage for the process fluid flow and extending along a longitudinal axis;
a valve component mountable on the valve housing;
a seal configured to circumferentially seal between the valve housing and the valve component; and
a contact abutment to be disposed in the axial direction between the seal and the valve housing, and which is configured to be movable in a pre-assembled state relative to the valve housing and relative to the valve component, wherein:

in an assembled state, the seal is inserted into an annular-groove-shaped seal receptacle limited by the valve component, the valve housing, and the contact abutment;
the valve housing, the valve component, and the contact abutment are matched to each other such that the seal receptacle is reduced when the valve component is mounted on the valve housing, the contact abutment being supported on the valve housing;
the contact abutment undergoing a relative movement relative to the valve component; and
the contact abutment is held axially movable to the valve component by a carrier, the carrier being configured to carry the contact abutment with the valve component when the valve component is removed.

2. The valve component arrangement according to claim 1, wherein the valve housing, the valve component, and the contact abutment are matched to each other such that the seal receptacle is reduced when the valve component is mounted on the valve housing for pressing the seal, wherein, in the mounted state, the seal is compressed in the axial direction.

3. The valve component arrangement according to claim 2, wherein, in the mounted state, the seal is expanded in the radial direction.

4. The valve component arrangement according to claim 1, wherein the carrier is arranged on the valve component, the carrier being configured to carry the seal with the valve component when the valve component is removed.

5. The valve component arrangement according to claim 4, wherein the contact abutment and/or the carrier is held to the valve component by a connection detachable in the radial direction.

6. The valve component arrangement according to claim 4, wherein the carrier comprises at least one engaging part radially protruding from the valve component, wherein the contact abutment comprises at least an axial undercut which is complementary in shape to the at least one engaging part and configured to receive the engaging part, the axial undercut being larger in the axial direction than the received engaging part.

7. The valve component arrangement according to claim 1, wherein the contact abutment and/or the carrier is held to the valve component by a connection detachable in the axial direction.

8. The valve component arrangement according to claim 7, wherein the connection detachable in the axial direction is a threaded pairing or a bayonet connection.

9. The valve component arrangement according to claim 1, wherein the contact abutment is annular, and is formed as one-piece or as multi-parts of pitch circle sections.

10. The valve component arrangement according to claim 1, wherein the valve component is a valve cage and the contact abutment is formed in one piece with a valve seat.

11. The valve component arrangement according to claim 1, wherein the valve component is a valve seat and/or a valve cage.

12. The valve component arrangement according to claim 1, wherein the carrier is further configured to carry the seal with the valve component when the valve component is removed.

13. The valve component arrangement according to claim 1, wherein:
the seal is a ring seal configured to circumferential seal between the valve housing and the valve component; and
the contact abutment is structurally separate from the valve housing, the contact abutment being configured to limit the annular-groove-shaped seal receptacle, in which the ring seal is seated, in the axial direction and the contact abutment is held in its operational state in the axial direction by axial pressing forces which are transmitted exclusively from the valve component via the ring seal to the contact abutment.

14. The valve component arrangement according to claim 1, wherein:
the carrier comprises at least one engaging pin that radially extends from the valve component, the contact abutment includes a recess that is complementary in shape to the at least one engaging pin and configured to receive the at least one engaging pin, the recess being larger in the axial direction than the received engaging pin; and
an axial clearance between the contact abutment and the at least one engaging pin, in a mounted state, is greater than an axial clearance between the valve housing and the valve component in a preassembled state.

15. A control valve comprising:
the valve component arrangement according to claim 1.

16. A valve component arrangement for a control valve for adjusting a process fluid flow of a process plant, comprising:
a housing configured to accept a process fluid flowing therethrough, the housing having a passage for the flow of the process fluid extending along a longitudinal axis;
a valve component mounted on the valve housing; and
a ring seal configured to circumferential seal between the valve housing and the valve component,
wherein, when the valve component is axially inserted into the valve housing, there is a threaded engagement between the valve housing and the valve component, and
wherein, with continued axial displacement of the valve component, the threaded engagement between the valve component and the valve housing is released, such that the valve component is displaceable longitudinally in the axial direction relative to the valve housing, thereby reducing the seal receptacle in the axial direction.

17. The valve component arrangement according to claim 16, wherein the seal is pressed in the seal receptacle axially between the valve housing and the valve component.

* * * * *